(12) United States Patent
Hailpern et al.

(10) Patent No.: US 9,189,540 B2
(45) Date of Patent: Nov. 17, 2015

(54) MOBILE WEB-BASED PLATFORM FOR PROVIDING A CONTEXTUAL ALIGNMENT VIEW OF A CORPUS OF DOCUMENTS

(71) Applicant: Hewlett-Packard Development Company, L.P., Houston, TX (US)

(72) Inventors: Joshua Hailpern, Mountain View, CA (US); Bernardo Huberman, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 13/857,533

(22) Filed: Apr. 5, 2013

(65) Prior Publication Data

US 2014/0304264 A1    Oct. 9, 2014

(51) Int. Cl.
*G06F 17/30* (2006.01)

(52) U.S. Cl.
CPC ................................ *G06F 17/30705* (2013.01)

(58) Field of Classification Search
None
See application file for complete search history.

(56) References Cited

U.S. PATENT DOCUMENTS

| | | | |
|---|---|---|---|
| 8,165,985 B2 | 4/2012 | Stefik | |
| 8,166,032 B2 | 4/2012 | Sommer et al. | |
| 8,296,168 B2 | 10/2012 | Subrahmanian et al. | |
| 2005/0125216 A1* | 6/2005 | Chitrapura et al. | 704/1 |
| 2006/0010145 A1* | 1/2006 | Al-Kofahi et al. | 707/100 |
| 2008/0133488 A1* | 6/2008 | Bandaru et al. | 707/3 |
| 2009/0112892 A1* | 4/2009 | Cardie et al. | 707/100 |
| 2010/0306251 A1* | 12/2010 | Snell | 707/769 |
| 2011/0022465 A1 | 1/2011 | Malleshaiah et al. | |
| 2011/0078167 A1* | 3/2011 | Sundaresan et al. | 707/765 |
| 2012/0123992 A1 | 5/2012 | Randall | |
| 2014/0258285 A1* | 9/2014 | Lavine | 707/728 |

OTHER PUBLICATIONS

Pang et al, "Opinion mining and sentiment analysis"', 2007.*
Li et al~"An Efficient Approach for Sentence-Based Opinion Retrieval"~Proc 9th Int'l Conf on Machine Learning & Cybernetics~Jul. 2010~pp. 6.

* cited by examiner

*Primary Examiner* — Hung Le
(74) *Attorney, Agent, or Firm* — Hewlett-Packard Patent Department

(57) ABSTRACT

A content platform for providing a mobile, web-based contextual alignment view of a corpus of documents is disclosed. A corpus of documents is mined to identify a set of topics. Each document in the corpus is analyzed to determine a set of opinions associated with the set of topics, the set of opinions including a corpus opinion. Each document in the corpus is classified based on alignment with the corpus opinion. The corpus of documents is presented to the user according to the document classification.

20 Claims, 14 Drawing Sheets

MOBILE WEB-BASED PLATFORM FOR PROVIDING A CONTEXTUAL ALIGNMENT VIEW OF A CORPUS OF DOCUMENTS

BACKGROUND

The explosive growth of user generated content, along with the increasing number and types of content sources, has made it challenging for users to sort out relevant pieces of information from the massive amounts of content available. In this information age where content is king, few content items live in a vacuum. Documents that express opinions or subject evaluations on a range of topics abound. Knowledge workers (e.g., political analysts, financial investors, economists, and business executives), legal professionals (e.g., clerks, lawyers, and judges), and those reading about other topics (e.g., entertainment, health, sports) have to navigate hundreds if not thousands of documents that have opinions, from which it is often hard to extract the relevant information needed.

This content proliferation, while empowering, has led to a poverty of attention. Users' attention to online content is often distributed in a highly skewed fashion. Most documents receive a negligible amount of attention, while only a few become extremely popular. Users may find it difficult to browse/find the most salient documents in a large corpus of documents and quickly spot relevant opinions in each document to situate them within a context or "big picture". Potentially relevant content may therefore be missed when users forage for information among large corpuses of interlinked documents.

Currently available content and document browsing solutions fail to help users allocate their attention effectively among the overabundance of information sources that might consume it. The currently available solutions suffer from critical limitations, including not being able to situate each document's opinion in a broader context and present key opinions in a manner that is natural to users. Many of the existing solutions add to the information overload by presenting the users with more information (e.g., multiple documents side-by-side) in increasingly smaller areas of screen real-estate. The problem becomes even more acute when mobile devices are used to browse content. Users must now not only secure relevant information, but mitigate/optimize access on mobile devices' small visual real estate while having a limited time and attention to process content.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
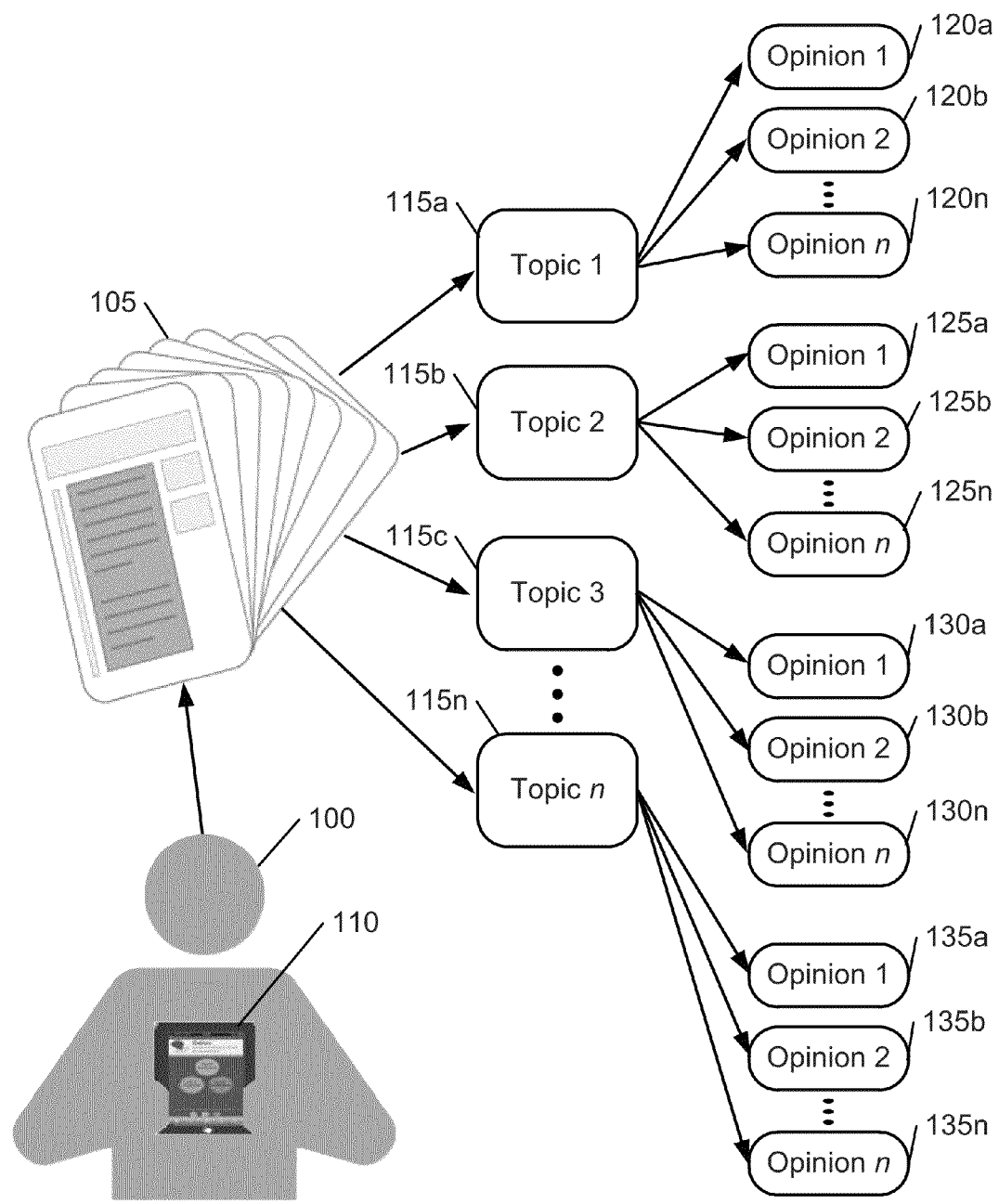
FIG. 1 illustrates a schematic diagram of an environment where a content platform is used in accordance with various examples.

A mobile, web-based content platform for providing a contextual alignment view of a corpus of documents is disclosed. The content platform enables users to quickly find documents in a corpus of documents based on their contextual alignment with the corpus. Contextual alignment, as generally described herein, refers to how well (or not) a document in a corpus of documents is aligned with the context of the corpus. Context, as generally described herein, refers to the corpus' opinion (i.e., the "wisdom of the crowd") on a given topic. The web-based content platform has quick, one-tap interactions that allow a user of a mobile device to find the most Relevant, Aligned or Divergent documents in the corpus without browsing the entire corpus, thereby allowing users to get in-and-out of a corpus as quickly and as efficiently as possible.

The documents in the corpus may include text, graphics, sound, video, and any other information that can be accessed in a mobile device, be it a computer, laptop, tablet, smart phone, personal digital assistant, gaming device, smart watch, wearable device, or any other such mobile device. The corpus of documents may include a collection of documents of a specific kind or on a specific subject, such as, for example, legal documents in a given lawsuit, articles written by a given author, documents discussing an issue, and so on. As generally described herein, a topic may include a subject of discussion or conversation and an opinion may include a view, belief, or judgment about a topic. Documents in the corpus are classified as Aligned, Divergent, or Relevant, based on the relationships between the documents' opinions and the corpus' opinion, i.e., whether they are contextually aligned or not with the corpus.

As described in more detail herein below, the content platform focuses on using opinion alignment to improve document selection, opinion highlighting, reading time and information retention and to make for a more meaningful and wide selection of crucial opinions. The content platform automates this process by gathering the corpus' consensus (via a corpus of documents), distilling what is being talked about in the documents, and examining how the documents' authors refer to those topics. The content platform then presents the user with documents and key sentences within each document based on the calculated context/alignment to the consensus opinions. Sentences and documents whose opinions are inline with those of the corpus are referred to as Aligned, and sentences and documents with opinions that go against the grain of the corpus are referred to as Divergent.

A weighting algorithm determines the rank, or presentation order, of each document and sentence based on how important its topics are, and how much the opinions are Aligned with or Divergent from the corpus opinion. A Relevance ranking is used to find the sentences or documents that are the most opinionated (regardless of whether the opinions are Aligned or Divergent from the corpus). Relevant documents can therefore be thought of as documents that provide a broad perspective into the corpus of documents.

In various examples, the content platform may include a document corpus opinion engine to mine a corpus of documents and determine a set of opinions associated with a set of topics, the set of opinions including a corpus opinion, a document classification engine to classify the documents in the corpus of documents based on their alignment with the corpus opinion, and a document user interface engine to present a contextual alignment view of the corpus of documents to a mobile device user based on the document classification. As described in more detail herein below, the document corpus opinion engine and the document classification engine employ machine learning and Natural Language Processing ("NLP") techniques to traverse a corpus of documents and gather the collective intelligence of the crowd to find and distill crucial opinions on key topics, including the corpus opinion on the topics.

The document user interface engine enables a mobile device user to quickly and efficiently place documents and their opinions in context through alignment with the corpus. The document user interface engine is tailored for mobile devices with limited screen sizes and mobile users who have a limited time to consume documents. Mobile users can quickly find documents given their time constraints and focus on the most important opinions in any document while still being able to see how each document and opinions within the documents fit in with the context of the corpus.

The document user interface engine has three key features to meet the varying needs of mobile users. First, to help users find a document that best meets their needs, the document user interface engine presents documents to users on three different scales: how Relevant, Aligned and Divergent the documents are from other documents in the corpus. Second, to help mitigate long document length, small screen sizes and limited time to consume each document, the document user interface engine provides an automatically generated Executive Summary of each document, highlighting key sentences and opinions for easy document digestion. Third, to address corpus size and complexity, the document user interface has quick one-tap interactions to allow a user to find the most Relevant, Aligned or Divergent documents without browsing, allowing users to get in-and-out of a corpus as quickly and as efficiently as possible.

The document user interface engine, with these three key features, addresses the following desirable characteristics of a mobile document user interface: (1) Support the planning phase of reading: the document user interface helps users quickly find important facts with little cognitive effort from a range of opinions from the perspective most applicable to a given user's needs; (2) support finding key documents: the document user interface reduces the cognitive load from managing multiple documents on mobile devices from a range of opinions from the perspective most applicable to a given user's needs; (3) mitigate document length: the document user interface employs visual techniques to help users find key sentences in documents regardless of document length; (4) document selection by alignment: the document user interface engine allows users to find documents based on their relation to the corpus' opinion (unlike existing solutions which focus on summaries, word count, or raw sentiment scores only); and (5) context based interaction: rather than a high-level abstract user interface (unlike summarization or sentiment extraction tools), the document user interface allows users to see all text within an individual's document context.

It is appreciated that, in the following description, numerous specific details are set forth to provide a thorough understanding of the examples. However, it is appreciated that the examples may be practiced without limitation to these specific details. In other instances, well known methods and structures may not be described in detail to avoid unnecessarily obscuring the description of the examples. Also, the examples may be used in combination with each other.

Referring now to FIG. 1, a schematic diagram of an environment where the content platform is used in accordance with various examples is described. User 100 would like to have mobile access to a corpus of documents 105 containing a large (e.g., 100s, 1000s, 1000000s, etc.) number of documents. The mobile access may be via an electronic device such as a smart phone 110 or a computer, laptop, tablet, personal digital assistant, gaming device, smart watch, wearable device, or any other such mobile device. User 100 may be a knowledge worker or professional (e.g., political analyst, finance professional, business executive, writer, legal professional, educator, health professional, etc.) that needs to review the corpus of documents 105 to extract, understand, and analyze its contents in a limited amount of time and in a limited screen space. Each document in the corpus of documents 105 may contain text (and other information such as images, graphics, video, etc.) that describes a number of topics 115$a$-$n$, with each topic characterized by a number of opinions (i.e., topic 115$a$ characterized by opinions 120$a$-$n$, topic 115$b$ characterized by opinions 125$a$-$n$, topic 115$c$ characterized by opinions 130$a$-$n$, and topic 115$n$ characterized by opinions 135$a$-$n$).

For example, the user 100 may be a junior financial analyst who must quickly get a grasp on a flood of financial reports and get into a meeting with his boss to discuss how they should handle their company's investments. The user 100 has access to a corpus of documents 105 containing financial reports from a number of sources, e.g., news agencies, newspapers, magazines, blogs, user-generated content from various sites, database collections, web sites, or various other sources. Each document in the corpus of documents 105 has text describing financial news such as the earnings release and outlooks of a company in user 100's investment portfolio. A topic may include, for example, the subjects "earnings", "outlook", among others. An opinion about a topic may include views such as "earnings are low", "outlook is negative", and "market is nervous".

The content platform described below enables the user 100 to quickly find documents in the corpus of documents 105 based on their contextual alignment with the corpus 105. The user 100 can, among other examples, quickly tap buttons on his mobile device screen 110 to load executive summaries of the Most Relevant, Most Aligned, and Most Divergent document in the corpus 105, tap sentences within any executive summary and load the full text of the document (with the tapped sentence highlighted), and tap buttons on his mobile device screen 110 to see all the Relevant, Aligned, or Divergent documents in the corpus 105.

Figure 2:
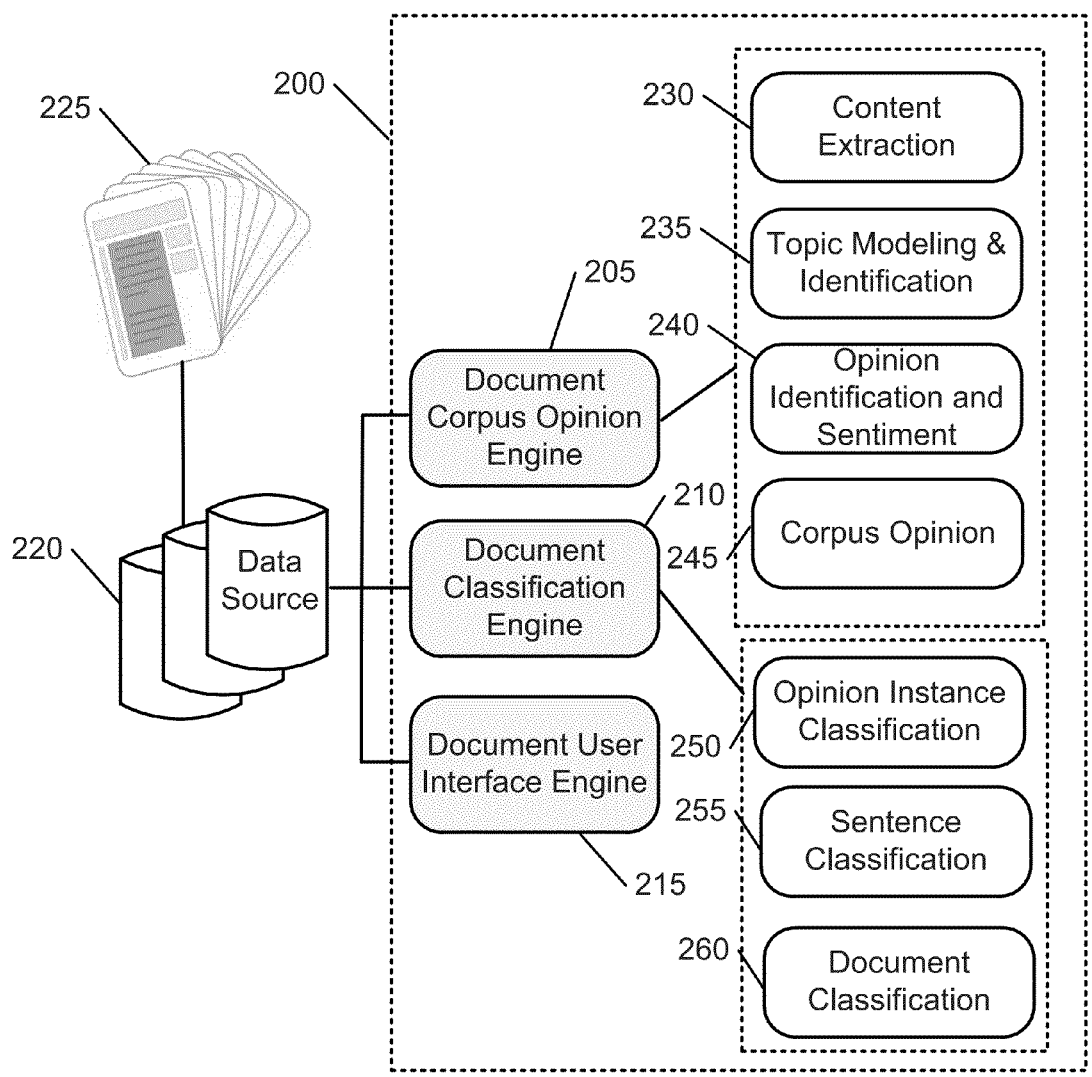
FIG. 2 illustrates examples of physical and logical components for implementing a content platform.

Attention is now directed to FIG. 2, which shows examples of physical and logical components for implementing the content platform. Content platform system 200 has various engines representing a combination of hardware and software, including: Document Corpus Opinion engine 205, Document Classification engine 210, and Document User Interface engine 215. Engines 205-215 operate in communication with one or more data stores 220 storing a corpus of documents 225.

The Document Corpus Opinion engine 205 mines the corpus of documents 225 to determine a set of opinions (including a corpus opinion) associated with a set of topics. The Document Corpus Opinion engine 205 employs machine learning and NLP techniques and is implemented in multiple stages explained in more detail below and including, for example: (1) Content Extraction stage 230; (2) Topic Modeling and Identification stage 235; (3) Opinion Identification and Sentiment stage 240; and (4) Corpus Opinion stage 245. The Document Classification engine 210 takes the opinions and topics determined by the Document Corpus Opinion engine 210 and uses them to classify opinion instances, sentences, and documents as Aligned, Divergent, or Relevant in the following stages: (1) Opinion Instance Classification stage 250; (2) Sentence Classification stage 255; and (3) Document Classification stage 260.

The Content Extraction stage 230 extracts a body copy of each document and reconstructs each document to make it easier to identify each element in the document for the machine learning and NLP techniques that are used in the later stages. A body copy, as generally described herein, consists of the main text of a document, as compared to logos, images, title, advertisements, comments, etc. The Topic Modeling & Identification stage 235 identifies what the documents in the corpus of documents 225 are talking about, that is, the topics discussed in the documents. The Opinion Identification & Sentiment stage 240 identifies the opinions on each topic of discussion. The Corpus Opinion stage 245 determines a corpus opinion for the corpus of documents 225 and opinion distances from the corpus opinion. The Opinion Instance Classification stage 250 classifies each opinion on a topic as Aligned, Divergent, or Relevant as compared to the corpus opinion. Similarly, the Sentence Classification stage 255 classifies each sentence as Aligned, Divergent, or Relevant as compared to the corpus opinion. Finally, the Document Classification stage 260 classifies each document in the corpus 225 as Aligned, Divergent, or Relevant as compared to the corpus opinion.

Once the corpus of documents 225 are mined by the Document Corpus Opinion engine 205 and the Document Classification engine 210, they are ready for the user to review using the Document User Interface engine 215. The Document User Interface engine 215 implements a web-based, mobile user interface that a user sees at his mobile device when reviewing a corpus of documents such as corpus 225. The Document User Interface engine 215 presents a contextual alignment view of the corpus 225 to a mobile device user based on the document classification determined by the Document Classification engine 210.

Figure 3:
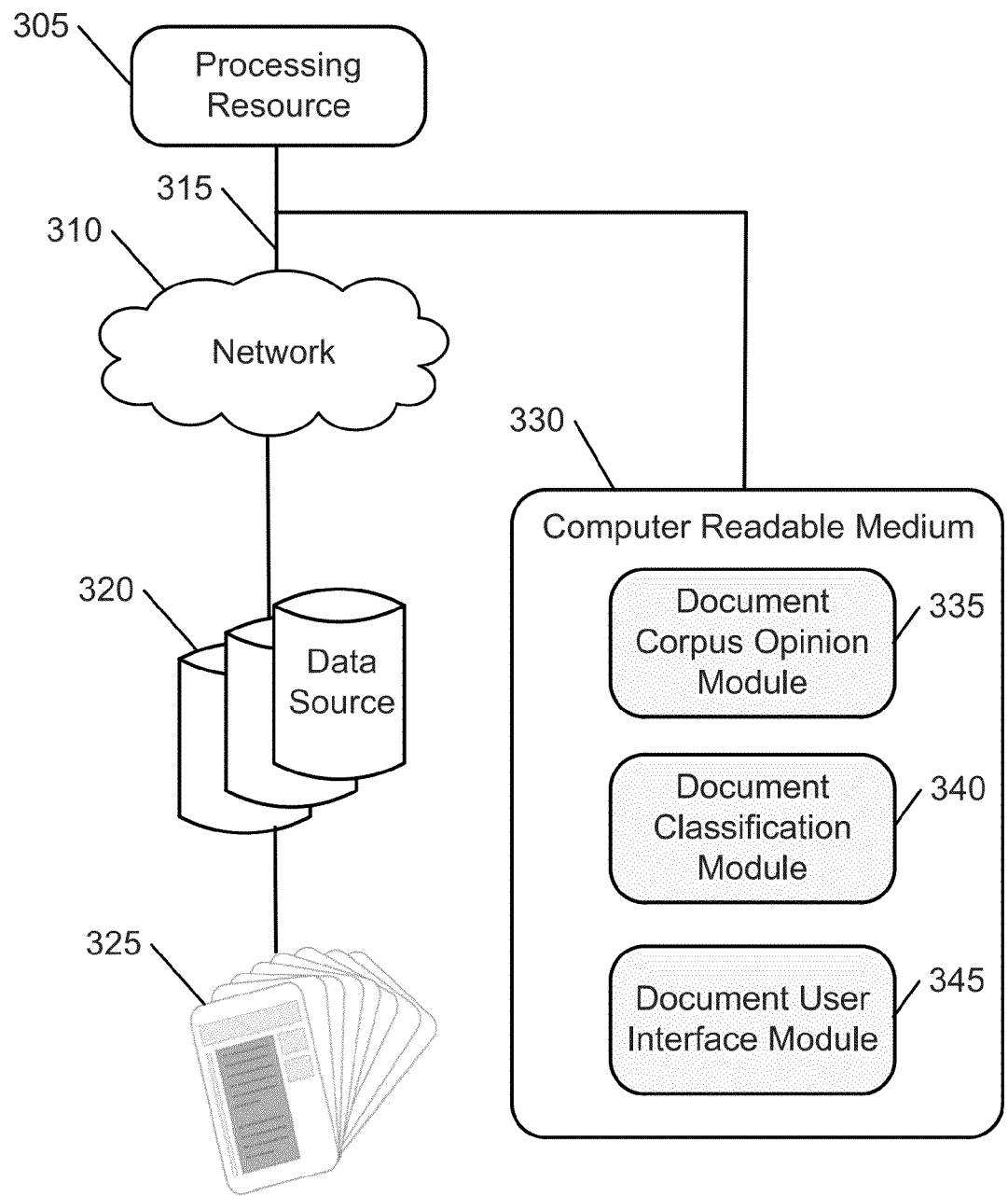
FIG. 3 illustrates an example implementation of the content platform of FIG. 2.

It is appreciated that Document Corpus Opinion engine 205, Document Classification engine 210, and Document User Interface engine 215 can be implemented in a number of fashions. FIG. 3 shows an example implementation with instructions executable by a processing resource 305 and stored on a tangible, non-transitory computer readable medium 310. Processing resource 305 can include one or multiple processors. Such multiple processors may be integrated in a single device or distributed across devices (e.g., in one or more web servers). The processing resource 305 can be connected to a network 310 by a wired or a wireless link 315. Data sources 320 storing a corpus of documents 325 may be accessible by the processing resource 305 via the network 310.

Computer readable medium 330 stores instructions that when executed by processing resource 305 implements the content platform system 200 illustrated in FIG. 2. As appreciated by one skilled in the art, computer readable medium 330 may be integrated in the same device as the processing resource 305 or it may be separate but accessible to that device and processing resource 305.

In one example, the instructions can be part of an installation package that when installed can be executed by processing resource 305 to implement content platform system 300. In this case, computer readable medium 330 may be a portable medium such as a CD, DVD, flash drive or memory maintained by a server from which the installation package can be downloaded and installed. In another example, the instructions may be part of an application or applications already installed. Here, computer readable medium 330 can include integrated memory such as a hard drive, solid state drive, or the like.

In FIG. 3, the executable instructions stored in computer readable medium 330 are represented as Document Corpus Opinion module 335, Document Classification module 340, and Document User Interface module 345, that when executed by processing resource 305, implement the content platform system 200 of FIG. 2. Document Corpus Opinion module 335 represents instructions that when executed function as Document Corpus Opinion engine 205. Document Classification module 340 represents instructions that when executed function as Document Classification engine 210. Document User Interface module 345 represents instructions that when executed function as Document User Interface engine 215.

Figure 4:
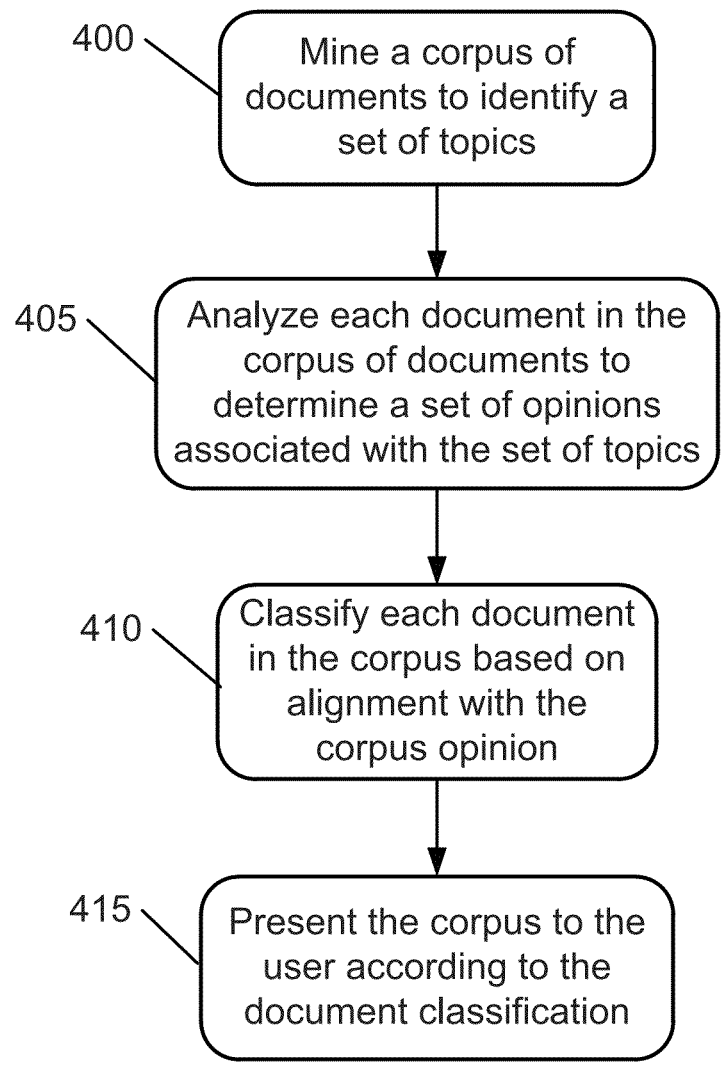
FIG. 4 is a flowchart of example operations performed by the content platform of FIG. 2 for providing a contextual alignment view of a corpus of documents.

Referring now to FIG. 4, a flowchart of example operations of the content platform of FIG. 2 for providing a mobile, web-based contextual alignment view of a corpus of documents is described. First, a corpus of documents is mined to identify a set of topics (400). The corpus of documents may be stored in one or more data sources (e.g., corpus of documents 225 stored in data sources 220 or corpus of documents 325 stored in data sources 320) and mined by, for example, the Document Corpus Opinion engine 205 (FIG. 2). Each document in the corpus of documents is then analyzed (e.g., by the Document Corpus Opinion engine 205) to determine a set of opinions (including a corpus opinion) associated with the set of topics (405). Each document in the corpus is then classified (e.g., by the Document Classification engine 210 in stages 250-260) based on alignment with the corpus opinion (410). Lastly, the corpus of documents is presented to a user of a mobile device according to the document classification (415).

As described above in FIG. 2, the Document Mining Engine 205 may implement steps 400 and 405 in multiple stages. For example, step 400 may be implemented by the Content Extraction stage 230 and the Topic Modeling and Identification Stage 235. Step 405 may be implemented by the Opinion Identification and Sentiment stage 240 and the Corpus Opinion stage 245. These stages are now described in more detail.

Figure 5:
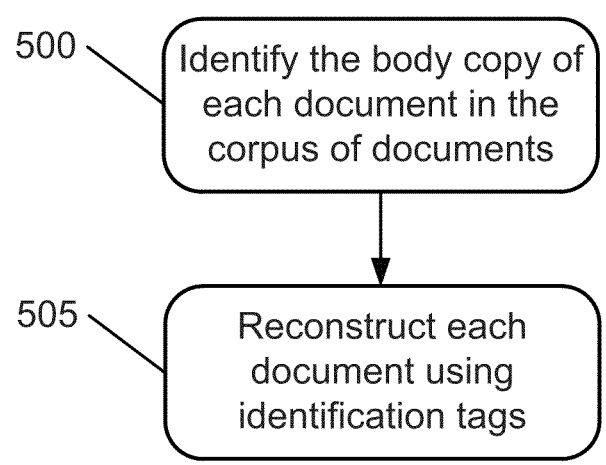
FIG. 5 is a flowchart for implementing the Content Extraction stage of FIG. 2.

FIG. 5 is a flowchart for implementing the Content Extraction stage of FIG. 2. First, the corpus of documents (e.g., corpus of documents 225 stored in data sources 220 or corpus of documents 325 stored in data sources 320) is crawled and each document in the corpus of documents is cleaned to identify its body copy (500). The body copy extraction depends on the type and format of the document. For example, extracting the body copy of a PDF document is simpler than extracting the body copy of HTML or other web content since PDF documents typically do not contain copious amounts of non-body copy material. Unlike PDFs, raw HTML documents may have navigation elements, ads, comments, or other non body copy content. Further complicating body copy extraction is that every HTML document may use different Cascading Style Sheet ("CCS") markup for its content. While templates, hand-coded or auto-generated, are often used to identify body copy, the number of templates needed would grow quite large (e.g., consider the diversity of the set of all sources from online news sources). One example to identify the body copy of HTML documents is to use the Content Extraction via Tag Ratios ("CETR") technique, which extracts body copy from HTML documents using HTML tag ratios and multidimensional clustering.

Once the body copy of a given document is extracted, the document is reconstructed using identification tags (505). For example, the identification tags may be HTML <span> or <p> tags. Each paragraph, sentence and word in a document may be labeled with a distinct identification tag. Doing so enables any element of text to be easily found using JavaScript or other such lookups and edited or visually modified as desired.

Figure 6:
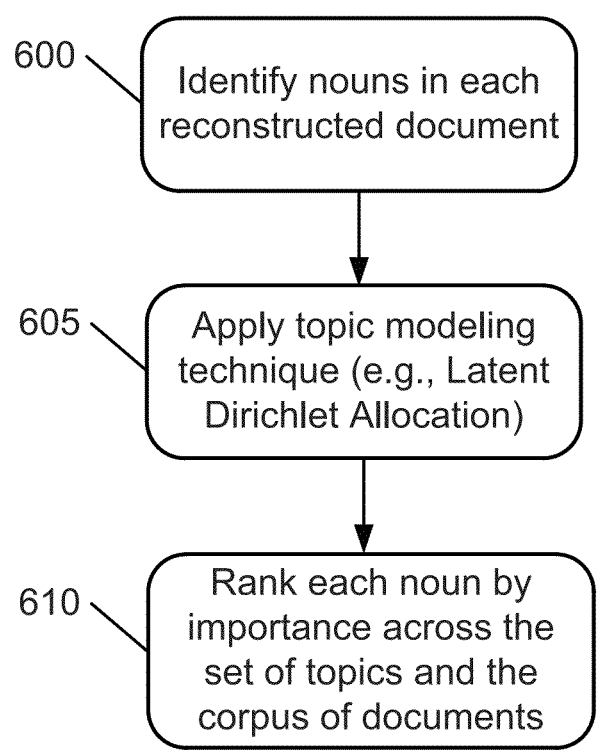
FIG. 6 is a flowchart for implementing the Topic Modeling and Identification stage of FIG. 2.

Once the documents in the corpus of documents have been reconstructed based on their body copy, the next step is to identify what the documents within the corpus of documents are talking about. FIG. 6 is a flowchart for implementing the Topic Modeling and Identification stage of FIG. 2. First, the nouns in each reconstructed document are identified (600). The nouns are used to determine the topics discussed in the corpus of documents as they are generally considered to be the "subject" of a sentence. In one example, Part-of-Speech ("POS") tagging and the Stanford NLP toolkit may be used to identify the nouns and filter the reconstructed documents.

With the nouns identified, the next step is to apply a topic modeling technique (605), such as, for example, for example, the Latent Dirichlet Allocation ("LDA") model. The LDA model considers each document as being the outcome of a mix of topics which each generate some portion of the document's content. Consider A to be the set of all topics ($a_0, a_1, \ldots, a_v$), B to be the set of all documents in the corpus of documents ($b_0, b_1, \ldots, b_m$), and C to be the set of all unique words ($c_0, c_1, \ldots, c_n$) across all documents. Any given document ($b_x$) is made up of a subset of words from C. Likewise, each topic ($a_w$) consists of a subset of words from C, each with a probability $P(c_y|a_w)$ that if a word is randomly chosen from $a_w$, $c_y$ is that particular word. In this way, $a_w$ is a probability distribution as follows:

$$\sum_{y=0}^{n} P(c_y \mid a_w) = 1 \quad \text{(Eq. 1)}$$

And a document $b_x$ consists of a probability distribution as follows:

$$\sum_{w=0}^{v} P(a_w \mid b_x) = 1 \quad \text{(Eq. 2)}$$

That is, every word in a document is contributed by one of the topics.

The goal of a topic modeling approach is ultimately to rank all words in C based on how important they are across all topics and documents (610). Here, the words are the nouns that have been identified in each reconstructed document. The LDA model determines the rank $P(c_y|a_w)$ of each word ($c_y$) given a particular topic ($a_w$). However, these word probabilities cannot be compared across topics as they are conditional. The rank for each word $P(c_y)$ is therefore determined across all topics:

$$P(c_y) = \sum_{w=0}^{v} P(c_y \mid a_w) P(a_w) \quad \text{(Eq. 3)}$$

This calculates a rank for each word that is topic independent, comparable across the corpus of documents. The rank from Equation 3 therefore determines a weight for how important or central each topic is in the corpus of documents.

Figure 7:
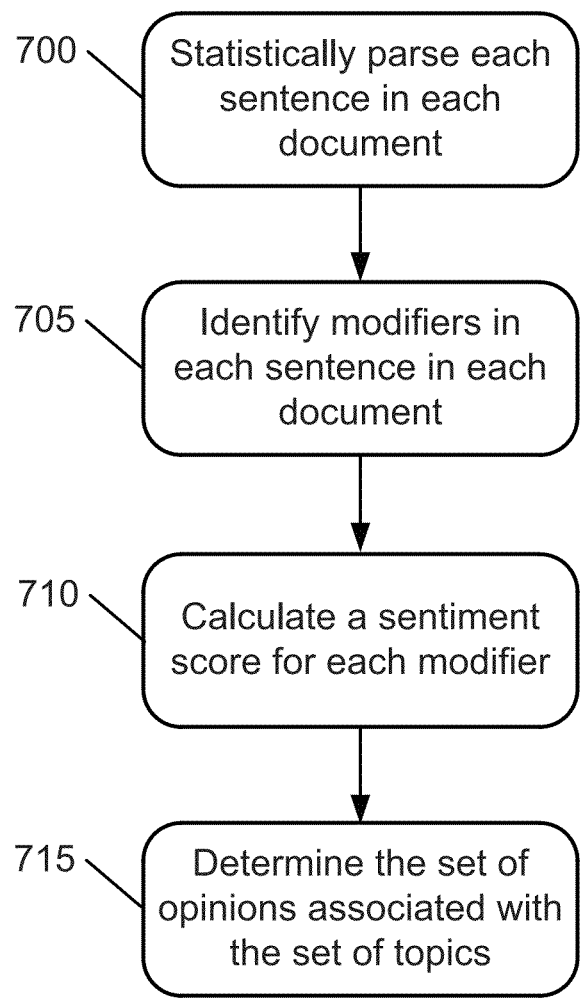
FIG. 7 is a flowchart for implementing the Opinion Identification & Sentiment stage of FIG. 2.

Attention is now directed to FIG. 7, which illustrates a flowchart for implementing the Opinion Identification & Sentiment stage of FIG. 2. The first step is to statistically parse each sentence in each document, generating a full parse tree, a dependence parse tree, and the POS for each word (700). From these parse trees, the modifiers (e.g., adjectives) in each sentence of each document are identified (705).

Next, a sentiment score is calculated for each modifier identified (710). In one example, the sentiment score may be calculated by looking up the value of the modifier in a resource such as Senti-WordNet, which is a hand-compiled list covering a large selection of common word modifiers. Each word is evaluated on two 0.0-1.0 scales, positive and negative. For example, the word "ugly" may have a negative score, while the word "beautiful" may have a positive one. Other words such as "red" may have more of a neutral score. Both positive and negative values are maintained for each modifier, because if combined on a single scale, on average, most results would trend towards neutral. It is appreciated that modifier lookup does not provide a sentiment score that takes into account word sense disambiguation (i.e., context). However, it enables an explicit association between a modifier and a subject in a sentence.

Lastly, a set of opinions is determined by associating the modifiers identified with their corresponding subjects/topics (715). That is, for each of the most important topics ($c_y$) identified as described with reference to FIG. 6, a set of opinions $D(c_y)$ within each sentence of every document where the topic occurs can be expressed as:

$$D(c_y) = [d_1(c_y), d_2(c_y), \ldots, d_u(c_y)] \quad \text{(Eq. 4)}$$

where $d_j(c_y)$ represents a modifier associated with a topic $c_y$. For example, $c_y$ may be "taxes" and $d_j(c_y)$ may be "high". One may notice that this gives a set of opinions for each subject in each document. As subjects may appear multiple times throughout the corpus of documents, the next step is then to aggregate all opinions on each subject over all documents in the corpus of documents and to determine an opinion associated with the entire corpus.

Figure 8:
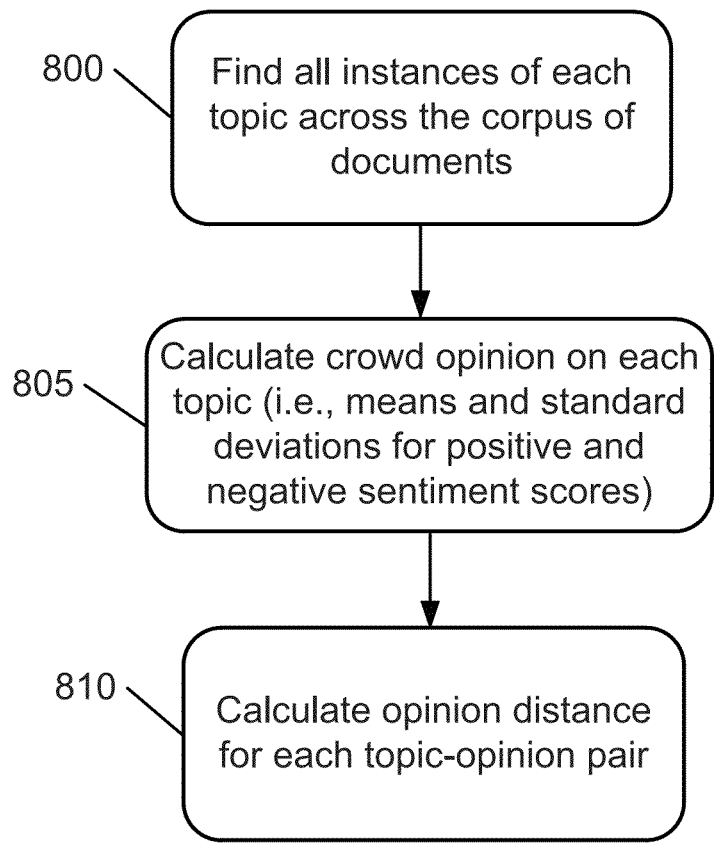
FIG. 8 is a flowchart for implementing the Corpus Opinion stage of FIG. 2.
Figure 9:
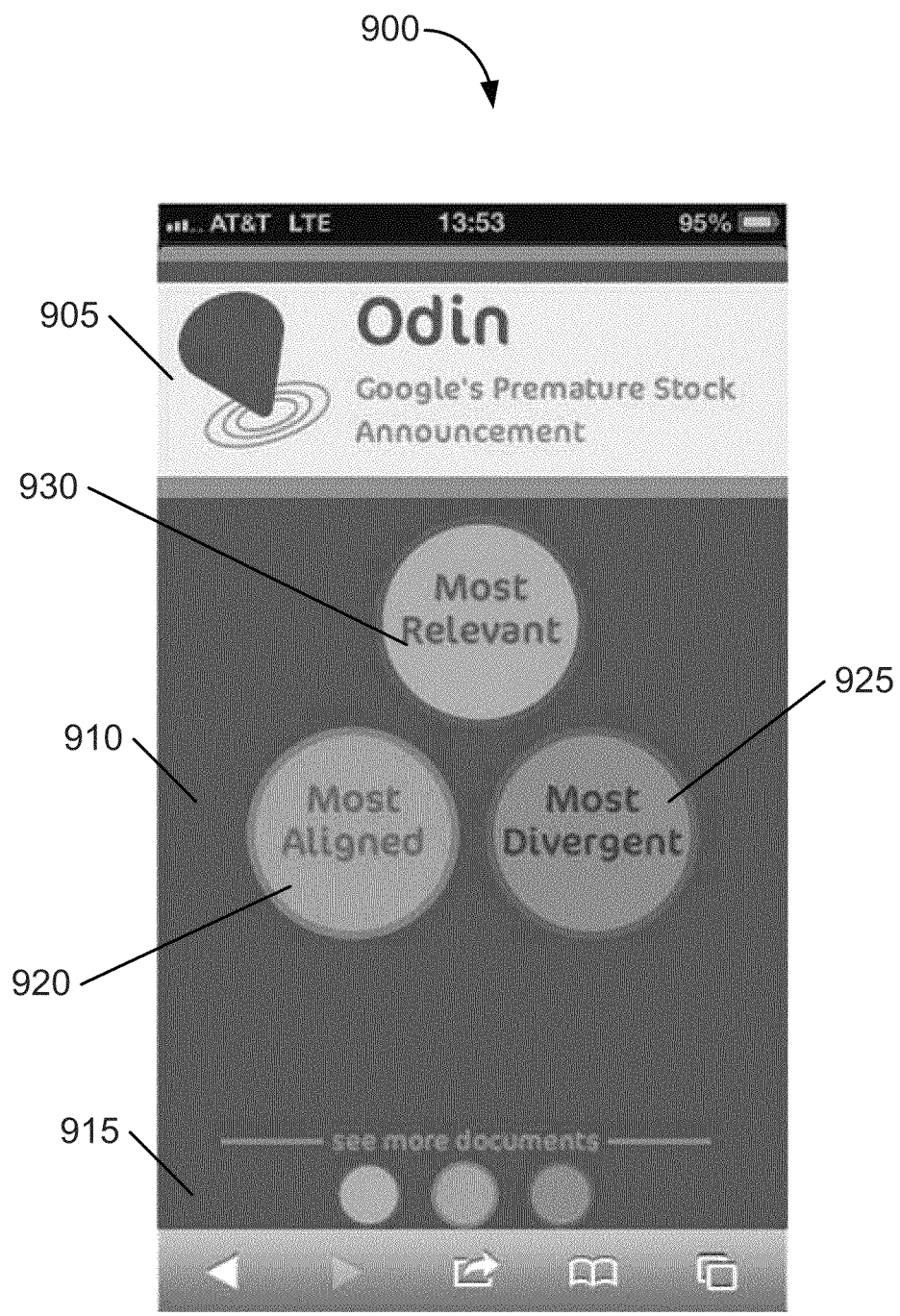
FIGS. 9-14 illustrate example screenshots for a Document User Interface implemented by the Document User Interface engine of FIG. 2.

Referring now to FIG. 8, a flowchart for implementing the Corpus Opinion stage of FIG. 2 is described. First, all instances of each topic across the corpus of documents are found by comparing the base form of each word and Americanizing all spelling (800). For a given corpus of documents, the stages described herein thus far (FIGS. 5-7) resulted in a weighted list of topics (i.e., the ranked topics from FIG. 6) and for each topic, a distribution of opinions $D(c_y)$ (from FIG. 7), that is, a list of topic-opinion pairs.

The next step is to aggregate these topics-opinions pairs across all documents in the corpus of documents to determine the collective, crowd opinions on each topic. Here, the corpus opinion is determined by calculating a mean positive sentiment score $\mu_{pos}(c_y)$ and a mean negative sentiment score $\mu_{neg}(c_y)$ (800). The standard deviations $\sigma_{pos}(c_y)$ and $\sigma_{neg}(c_y)$ are also calculated. Then, for each topic-opinion pair in each document, i.e., for each $o_x(w_q)$, an opinion distance measure $E(d_z(c_y))$ can be calculated as (810):

$$E(d_z(c_y)) = \langle E_{pos}(d_z(c_y)), E_{neg}(d_z(c_y)) \rangle \quad \text{(Eq. 5)}$$

where $E_{pos}(d_z(c_y))$ gives a distance for a positive opinion relative to the corpus opinion about a topic and $E_{neg}(d_z(c_y))$ gives a distance for a negative opinion relative to the corpus negative opinion about a topic. These can be determined as:

$$E_{pos}(d_z(c_y)) = \frac{|d_{pos,z}(c_y) - \mu_{pos}(c_y)|}{\sigma_{pos}(c_y)} \quad \text{(Eq. 6)}$$

$$E_{neg}(d_z(c_y)) = \frac{|d_{neg,z}(c_y) - \mu_{neg}(c_y)|}{\sigma_{neg}(c_y)} \quad \text{(Eq. 7)}$$

Given the above calculated corpus opinion, the Opinion Classification stage 250 in the Document Classification engine 210 can now determine how Aligned or Divergent a given opinion is. Whereas $D(c_y)$ is the set of all opinions on a given word, the set of all opinions across all words in all documents can be expressed as follows:

$$F = \bigcup_{q=0}^{p} (D(c_y)) \quad \text{(Eq. 8)}$$

An individual opinion on a given instantiation of a word can thus be defined as $f_q = d_z(c_y)$. Therefore, $f_q$ can be substituted for any $d_z(c_y)$ so that each word can have an Alignment (G) or Divergent (H) score as follows:

$$E_S(f_q) = \text{MAX}(E_{pos}(f_q), E_{neg}(f_q)) \quad \text{(Eq. 9)}$$

$$G_{opinion}(f_q) = G_{opinion}(d_z(c_y)) \propto P(c_y) * E_S(f_q) \quad \text{(Eq. 10)}$$

$$H_{opinion}(f_q) = H_{opinion}(d_z(c_y)) \propto \frac{P(c_y)}{E_S(f_q)} \quad \text{(Eq. 11)}$$

These scoring functions were based on two principals: first, alignment should grow as distance from the corpus opinion shrinks (hence in the denominator) while divergence should shrink (hence as a multiplier); second, both alignment and divergence grow as importance of the topic increases. In addition, an individual opinion can be considered to be a specific instance of a word as being "Aligned" if G>H (and "Divergent" if H>G).

The inclusion of topic importance ($P(c_y)$) in the scoring functions above (Eqs. 10-11) has an added benefit—both $G_{opinion}$ and $H_{opinion}$ become topic independent, and can be compared or combined at a sentence (or document) level with the $G_{opinion}$, and $H_{opinion}$ of another topic (which may have a different weight in the model from the Topic Modeling & Identification stage 230). The set of all subject opinions ($\{f_q\}$) within a given sentence can be determined as $I=\{f_q\}$. Subsequently, the alignment or divergence of a sentence is a sum over all opinions' alignment or divergence scores:

$$G_{sentence}(I) = \sum_{r=0}^{|I|} G_{opinion}(i_r) \quad \text{(Eq. 12)}$$

$$H_{sentence}(I) = \sum_{r=0}^{|I|} H_{opinion}(i_r) \quad \text{(Eq. 13)}$$

As described earlier, relevance can be determined for sentences or documents that have a broad set of opinions. To calculate a relevance score for a sentence (J), the Alignment and Divergence scores for the sentence can be combined as:

$$J_{sentence}(I) = G_{sentence}(I) + H_{sentence}(I) \quad \text{(Eq. 14)}$$

Thus, the more opinions rendered (Aligned, Divergent, or both) on the more important topics, the higher the appropriate score will be, and are sorted accordingly based on their raw scores.

Calculating Alignment, Divergence or Relevance scores for documents in the Document Classification stage 260 follows a similar approach to that of Sentence Classification stage 255. The set of all opinions in a document can be defined as K={I}, with scoring functions using sum, rather than mean, so as to give more weight to documents that have many opinions, rather than one strong opinion:

$$G_{document}(I) = \sum_{o=0}^{|K|} G_{sentence}(k_o) \quad \text{(Eq. 15)}$$

$$H_{document}(I) = \sum_{o=0}^{|K|} H_{sentence}(k_o) \quad \text{(Eq. 16)}$$

Documents, unlike sentences, have the potential to contain more opinions simply because they have more words (not because the document is more opinionated). Consider a corpus where all documents contain at least 1% Divergent comments. A longer document, which is largely Aligned, may appear to also be very Divergent, simply because of its length (as compared to a short document which is 95% Divergent, but so short that the sum is smaller than the longer document). As a result, documents that are highly Aligned or Divergent can be determined by computing a delta between the two raw scores:

$$\delta_{Aligned}(K) = G_{document}(K) - H_{document}(K) \quad \text{(Eq. 17)}$$

$$\delta_{Divergent}(K) = H_{document}(K) - G_{document}(K) \quad \text{(Eq. 18)}$$

Thus, documents whose Alignment score is much larger than their Divergent score appear more aligned, and documents whose Divergent score is much larger than their Alignment score appear more Divergent.

With documents classified as Aligned, Divergent, or Relevant, the Document User Interface engine 215 can display the documents to a mobile user. Referring now to FIGS. 9-14, screenshots of a web-based user interface, generated by the Document User Interface engine 215 are described. User interface window 900 is displayed at a user's mobile device screen to enable the user to have a contextual alignment view of a corpus of documents. Any type of document can be loaded, analyzed, and accessed: PDFs (e.g. legal documents or financial analysts reports), DOCX (e.g. student essays to be graded), or HTML (e.g. product discussion blogs, online news, etc.), among others. A document uploader and an automatic Google News crawler (allowing a user to upload any corpus of documents they wish) may be used with the user interface 900 as well to repopulate the system with current news events.

The user, upon accessing the user interface window 900, is displayed a window with three distinct sections: (1) section 905 describing the corpus of documents displayed; (2) section 910 with different color buttons for the Most Aligned, Divergent, and Relevant documents in the corpus of documents; and section 915 with different color buttons for all the Aligned, Divergent, and Relevant documents in the corpus of documents.

Figure 10:
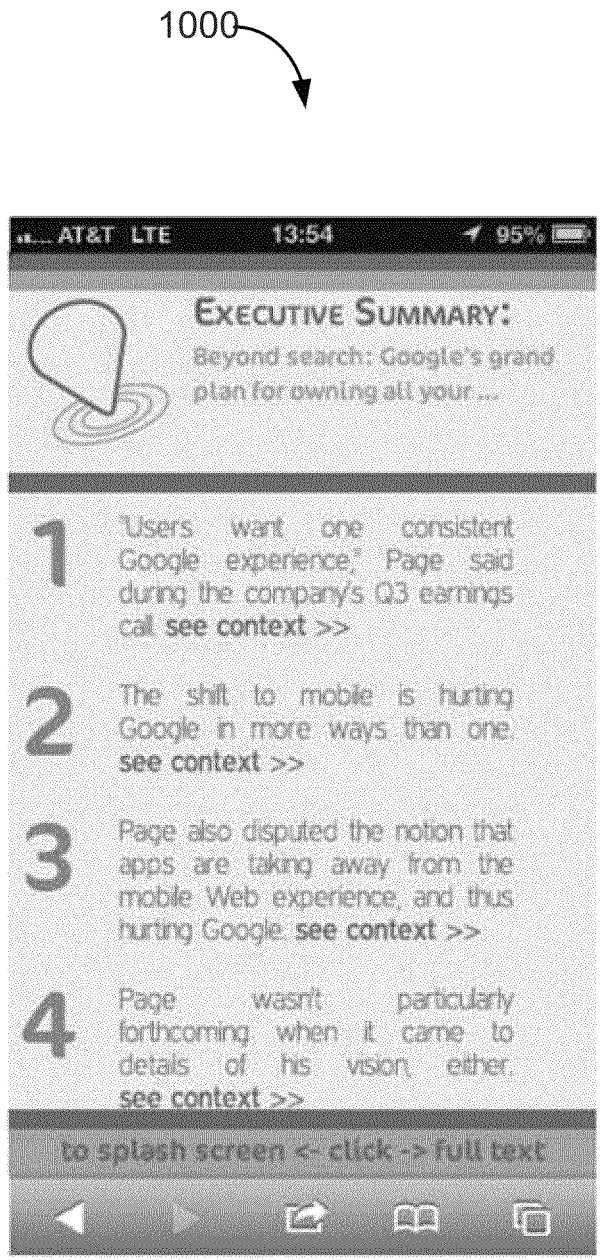
Figure 11:
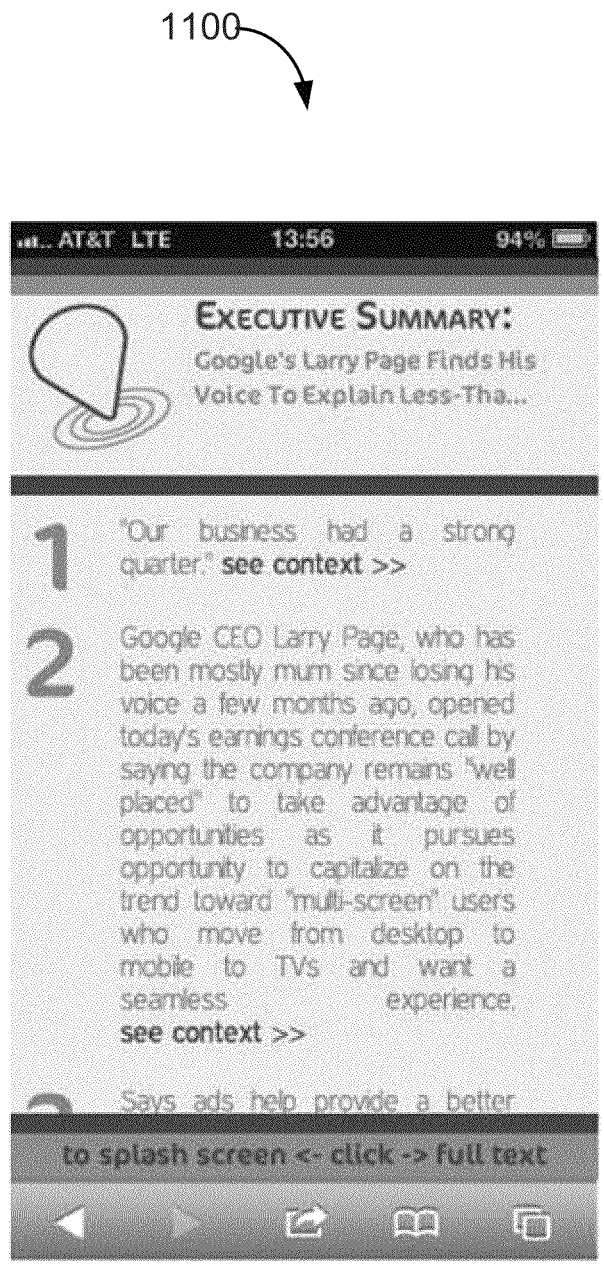
Figure 12:
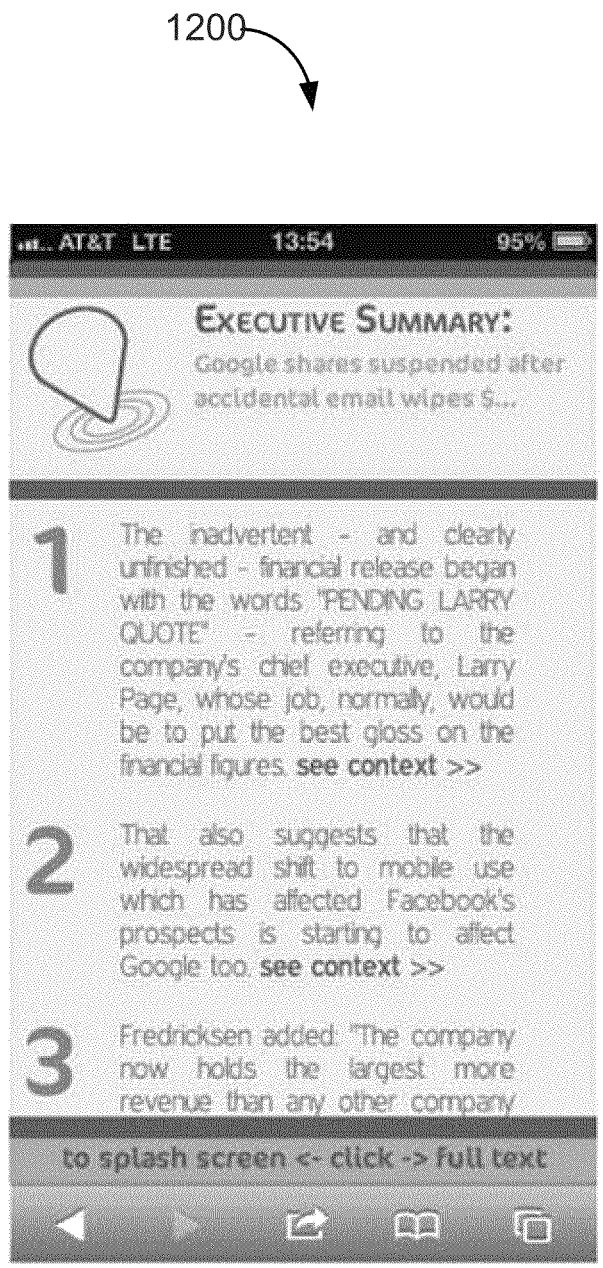

Clicking on any of the buttons in section 910 opens up a new window in the user's mobile device showing the executive summary of the Most Aligned, Divergent, and Relevant documents in the corpus of documents. For example, window 1000 in FIG. 10 is displayed when the user clicks on button 920 for the Most Aligned document in the corpus of documents, window 1100 in FIG. 11 is displayed when the user clicks on button 925 for the Most Divergent document in the corpus of documents, and window 1200 in FIG. 12 is displayed when the user clicks on button 930 for the Most Relevant document in the corpus of documents.

Figure 13:
Figure 14:
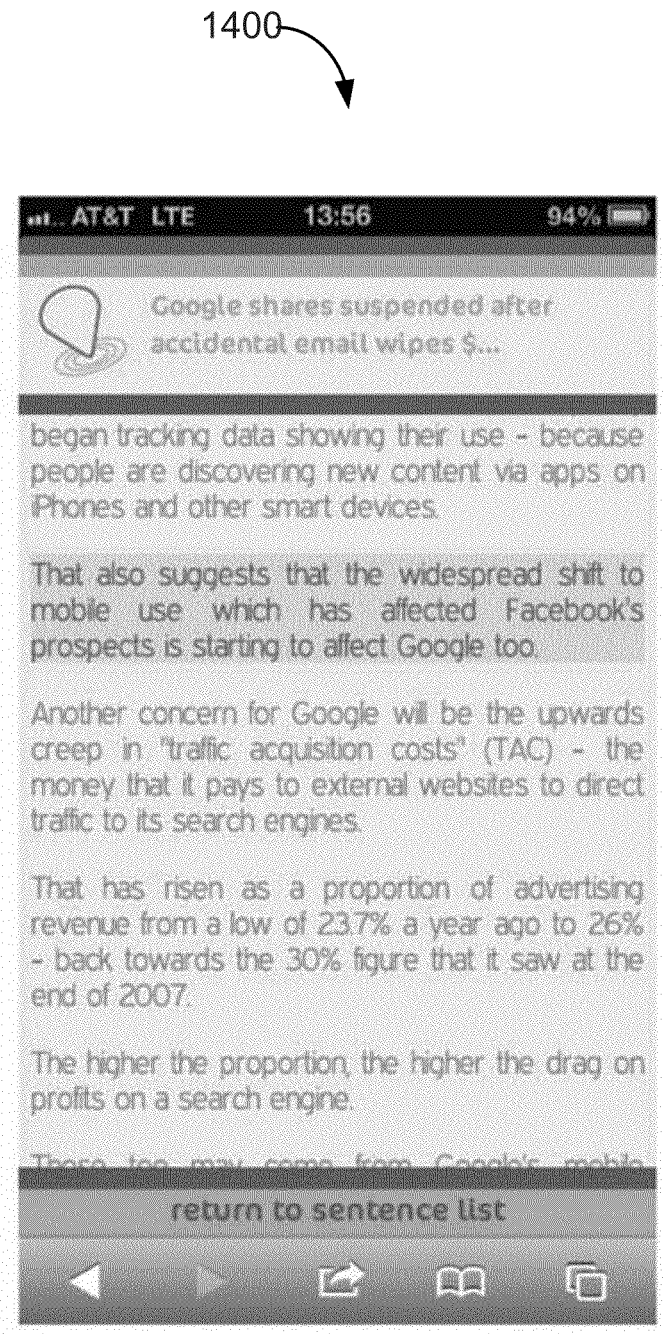

Clicking on any of the buttons in section 915 opens up a new window in the user's mobile device showing a list of all the Aligned, Divergent, and Relevant documents in the corpus of documents. For example, window 1300 in FIG. 13 is displayed when the user clicks on button 935 for the list of Relevant documents in the corpus of documents. Each document in the list is presented with its title, and a preview of the first sentence in the document. Upon tapping a document, the user gets an Executive Summary for that specific document, as shown in FIG. 14. In addition, if the user finds a document that appears extremely compelling, he can read the full text at any point in time. Along the bottom of the Executive Summary window of the document, the user can tap the words "full text", which will load the full text of the document.

To illustrate the breadth of the features and multiple uses of the Document User Interface generated by the Document User Interface engine 215, a series of three overly extensive scenarios are described herein below. In practice, users may apply any subset of the following techniques at any time or in any order. Each scenario involves a fictitious Anthony, a financial analyst, having progressively less time to react: Anthony is a junior financial analyst for the also fictitious Kirby, Lee & Co. On Oct. 19, 2012 Anthony heard about Google's accidental earnings report release, and the negative Google's financial outlook. Anthony must quickly get a grasp on the flood of financial reports and get into a meeting with his boss Brooke to discuss how they should handle their company's investments. Anthony loads a corpus of financial reports into the user interface 900. The scenarios illustrate the novel interactions (e.g., quick select buttons, executive summary, and contextual highlighting), and perspectives into a corpus (Relevance, Alignment, and Divergence).

Scenario 1: A Matter of Minutes

As news comes across Anthony's desk about Google's announcement and he gets a worried email from his boss requesting an immediate meeting, Antony grabs his mobile phone, and heads from his office to Brooke's (only a short distance away). Anthony needs to get up to speed on the issues at hand quickly, while walking. Anthony opens up the Document User Interface generated by the Document User Interface engine 215 with a dataset of financial articles about Google's premature announcement, and is presented with the window 900. While the corpus of documents has hundreds of documents, Antony only has time to read one. Whichever document Anthony reads must provide him with the most information possible. On the window 900, Anthony taps the button 930 labeled "Most Relevant". This loads the Executive Summary (FIG. 12) for the most Relevant document (based on the document classification determined by the Document Classification stage 260 described above), which is entitled "Google shares suspended after accidental email wipes".

The Most Relevant document can be thought of as the document with the broadest spectrum of opinions; those that are both representative of the corpus (i.e., aligned with the corpus opinion) and those that are out of line with the corpus (i.e., divergent from the corpus opinion). It is the document that allows Anthony to get up to speed on the entire corpus of documents the fastest. While the quick tap may have helped Anthony find a good document, it is still a very long piece of text—too long to read quickly, especially on a mobile device (even with pagination). Much like an executive assistant helps a CEO, the Document User Interface generated by the Document User Interface engine 215 displays an Executive Summary with key sentences from that document, sorted in ranked order based on how Relevant they are as compared to the opinions of the corpus. Thus, Anthony can quickly and easily find the most interesting information in the document, covering a broad set of opinions regardless of the length of the original document or where the opinions occurred in the source text.

Scenario 2: Meeting in a Few

In this situation, Brooke (Anthony's boss) asks for an all-hands meeting in ten minutes. Anthony has only a short time to get prepared and ready to discuss Google finances. Anthony grabs his mobile phone, heads to the meeting room (he does not want to be late) and begins to use the Document User Interface generated by the Document User Interface engine 215 to do research until the meeting begins. Given a slightly more relaxed time constraint, Anthony wants to explicitly see what the corpus' conscious is about the Google announcement. In addition, it is also quite useful to know what outlying opinions are being voiced. Rather than click on the Most Relevant document, as in the above scenario, Anthony directs the attention to the two other quick select options on the splash screen: "Most Aligned" in button 920 and "Most Divergent" in button 925.

Similar to the "Most Relevant" button 930, these other two quick select options will load the "most" Aligned or Divergent document into the Executive Summary view (FIGS. 10 and 11 respectively), highlighting the key sentences/opinions in ranked order. Within the Aligned Executive Summary (FIG. 10), Anthony can see the general consensus for Google, which appears to focus on the company's mobile outlook. In short, Google has not monetized their mobile platform well. In the Divergent view in FIG. 11, the most Divergent opinion in the entire corpus is a quote, "Our business had a strong quarter". When Anthony sees such a strikingly different point of view that clearly goes against the grain, Anthony wants to see more and understand where this statement is coming from. Within any Executive Summary, Antony can tap a given sentence and the Document User Interface generated by the Document User Interface engine 215 loads the full document text, highlights the tapped sentence, and auto scrolls the full text to the location of the highlight.

Now Anthony can see the full context of that sentence, and can easily see that this is a quote from the Chief Business Officer, who is attempting to spin lukewarm results in the best way possible. While this is so different from the consensus, Anthony now can see Google's perspective, why Google thinks they should be viewed positively, and Anthony also now realizes that these views are not shared by the financial analysts.

Scenario 3: On the Train-Ride to Work

The final scenario begins early in the morning before Anthony gets to work. As Anthony is packing up for his morning commute, his boss sends an email requesting an all-hands meeting to discuss the premature Google announcement. Anthony has roughly a thirty minute window of time, during his train commute, to get caught up with the financial reports to be discussed. Because the train is not the place to pull out a laptop, he turns on his phone and to window 900. As in the above scenarios, Anthony quickly skims the three quick selection documents, getting a broad overview of key opinions with the most Relevant Aligned, and Divergent documents. These provide him an overview of the situation.

However, given the increased amount of time available, Anthony wants to delve deeper and expand his understanding of the issue, and the opinions of the financial analysts. To do so, Anthony can click on the buttons in section 915 to see the full corpus of documents sorted by how Relevant, Aligned, or Divergent the document is. The color of the buttons in section 915 corresponds with the sort order (one color for Relevant, another color for Aligned, and yet another color for Divergent). Each document in the list is presented with its title, and a preview of the first sentence in the document. Upon tapping a document, Anthony gets an Executive Summary for that specific document. In addition, if Anthony finds a document that appears extremely compelling, he can read the full text at any point in time. Along the bottom of the Executive Summary, Anthony can tap the words "full text", which will load the full text of the document.

It is appreciated that the user interface windows shown in FIGS. 9-14 are shown for illustration purposes only. Additional features may be incorporated into the user interface to give further insight into the context (e.g., alignment, divergence, relevance scores, etc.) of a document corpus. For example, the user interface may have a quick tap button for "popular" sources of content (e.g., the author of the document is more reputable or well known or relative to reputable opinions, or disreputable opinions), a quick tap button for documents that were read by many people viewing the corpus (social popularity or relative to socially popular opinions), a button to allow users to see articles that are aligned/divergent from the currently open document (relative alignment), a button showing how a document's classification can be adapted based on individual user's viewing preferences or histories across multiple corpuses, a list of the Most Relevant, Aligned, and Divergent opinions from the most Relevant, Aligned, and Divergent document (respectively), and summary statistics (e.g. number of Aligned opinions on topic A), among others.

Advantageously, the content platform described herein enables users to quickly have a contextual alignment view of a corpus of documents within the limited screen sizes of mobile devices. The content platform is able to mine documents in a corpus of documents to identify the Most Aligned, Divergent, and Relevant documents in the corpus. This allows a user to focus his attention on the important topics and opinions within documents and how they relate to the crowd within a limited amount of time.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computer implemented method for providing a mobile, web-based contextual alignment view of a corpus of documents, comprising:
    mining a corpus of documents to identify a set of topics;
    analyzing each document in the corpus to determine a set of opinions associated with the set of topics, the set of opinions including a corpus opinion;
    classifying each document in the corpus based on alignment with the corpus opinion; and
    presenting the corpus to the user according to the document classification, wherein the presenting comprises displaying buttons on a user interface window fir the Most Aligned, Most Divergent, and Most Relevant documents in the corpus.

2. The computer implemented method of claim 1, wherein mining a corpus of documents to identify a set of topics comprises extracting a body copy of each document in the corpus of documents.

3. The computer implemented method of claim 1, wherein mining a corpus of documents to identify a set of topics comprises ranking each word in the corpus of documents by importance across the set of topics and the corpus of documents.

4. The computer implemented method of claim 1, wherein analyzing each document in the corpus of documents to determine a set of opinions associated with the set of topics comprises statistically parsing each sentence in each document to determine a set of modifiers associated with a subject in each sentence.

5. The computer implemented method of claim 4, further comprising calculating a sentiment score for each modifier.

6. The computer-implemented method of claim 5, wherein the set of opinions associated with the set of topics comprises a set of modifiers associated with a set of subjects.

7. The computer implemented method of claim 6, further comprising determining a distribution of opinions across the corpus of documents.

8. The computer implemented method of claim 1, wherein classifying each document in the corpus based on alignment with the corpus opinion comprises classifying each document as aligned, divergent or relevant.

9. The computer implemented method of claim 8, wherein classifying each document as aligned, divergent or relevant further includes determining a scoring function.

10. The computer implemented method of claim 9, wherein the scoring function is based on topic importance.

11. The computer implemented method of claim 10, wherein the scoring function is indicative of increase of alignment and divergence with an increase in the topic importance.

12. The computer implemented method of claim 1, further comprising displaying buttons for the Aligned, Divergent, and Relevant documents in the corpus.

13. The computer implemented method of claim 12, further comprising displaying executive summaries for the Aligned, Divergent, and Relevant documents in the corpus.

14. A mobile, web-based content platform system for providing a contextual alignment view of a corpus of documents, comprising:
    a document corpus opinion engine to mine a corpus of documents and determine a set of opinions associated with a set of topics, the set of opinions including a corpus opinion;
    a document classification engine to classify the documents in the corpus of documents based on their alignment with the corpus opinion; and
    a document user interface engine to present a contextual alignment view of the corpus of documents to a mobile device user based on the document classification, wherein the document user interface engine presents a Most Aligned, a Most Divergent, and a Most Relevant document to the user.

15. The content platform system of claim 14, wherein the document corpus opinion engine statistically parses each sentence in each document to determine a set of modifiers associated with a subject in each sentence, the set of modifiers associated with a subject representing a plurality of opinions about the subject.

16. The content platform system of claim 15, wherein the document corpus opinion engine classifies an opinion in the set of opinions as an Aligned, Divergent, or Relevant opinion.

17. The content platform system of claim 14, wherein the document user interface engine presents Aligned, Divergent, and Relevant documents to the user.

18. A non-transitory computer readable medium comprising instructions executable by a processor to:
   identify a set of topics and a set of opinions associated with the set of topics in a corpus of documents, the set of opinions including a corpus opinion;
   classify the documents in the corpus based on their alignment with the corpus opinion; and
   present the corpus of documents to a user based on the document classification, wherein the instructions to present the corpus of documents comprise instructions to present a Most Aligned, a Most Divergent, and a Most Relevant document to the user.

19. The non-transitory computer readable medium of claim 18, wherein to present the corpus of documents to a user based on the document classification comprises to present Aligned, Divergent, and Relevant documents to a user.

20. The non-transitory computer readable medium of claim 19, wherein to present the corpus of documents to a user based on the document classification comprises to present executive summaries of Aligned, Divergent, and Relevant documents to the user.

* * * * *

UNITED STATES PATENT AND TRADEMARK OFFICE
CERTIFICATE OF CORRECTION

| | | |
|---|---|---|
| PATENT NO. | : 9,189,540 B2 | Page 1 of 1 |
| APPLICATION NO. | : 13/857533 | |
| DATED | : November 17, 2015 | |
| INVENTOR(S) | : Joshua Hailpern et al. | |

It is certified that error appears in the above-identified patent and that said Letters Patent is hereby corrected as shown below:

IN THE CLAIMS

In column 14, line 1, in Claim 1, delete "fir" and insert -- for --, therefor.

Signed and Sealed this
Fifth Day of April, 2016

Michelle K. Lee
*Director of the United States Patent and Trademark Office*